United States Patent [19]

Saitoh et al.

[11] Patent Number: 4,832,457

[45] Date of Patent: May 23, 1989

[54] MULTIPANEL LIQUID CRYSTAL DISPLAY DEVICE

[75] Inventors: Masakatsu Saitoh, Yokohama; Yuko Kumisawa, Kawasaki; Jun Yamada, Yokohama; Kohzoh Satoh, Yokohama, all of Japan

[73] Assignee: Hitachi, Ltd., Tokyo, Japan

[21] Appl. No.: 155,811

[22] Filed: Feb. 16, 1988

[30] Foreign Application Priority Data

Feb. 16, 1987 [JP] Japan .................................. 62-31386

[51] Int. Cl.$^4$ ............................................... G02F 1/13
[52] U.S. Cl. ..................................... 350/334; 350/335
[58] Field of Search ................................ 350/334, 335

[56] References Cited

U.S. PATENT DOCUMENTS 4,396,250 8/1983 Wada et al. ......................... 350/335
4,487,480 12/1984 Nonomura et al. ................. 350/335

FOREIGN PATENT DOCUMENTS 0077884 4/1986 Japan .

OTHER PUBLICATIONS

Piggin, "Flat Panel Display Device", *IBM Technical Disclosure Bulletin*, vol. 21, No. 10 (Mar. 1979).

*Primary Examiner*—Stanley D. Miller
*Assistant Examiner*—Anita E. Pellman
*Attorney, Agent, or Firm*—Antonelli, Terry & Wands

[57] ABSTRACT

A multipanel liquid crystal display device and a method of manufacturing such a device is disclosed. The liquid crystal display device comprises two or four panels of square shape each including a first plate of square shape. These two or four first plates are disposed in such a positional relation that at least two orthogonally crossing sides of each of the plates are not adjoined by any one of the remaining plates thereby forming a planar assembly lying in the plane. One of the major surfaces of each of the first plates provides a display region except marginal edges adjacent to the at least two orthogonally crossing sides not adjoined by any one of the remaining plates, and picture element electrodes arranged in a matrix pattern are previously provided on this display region. Further, in each first plate, electrode lead-out terminals connected to the respective picture element electrodes are previously disposed along the marginal edges adjacent to the two sides described above. The liquid crystal display device further comprises a transparent second plate having a common electrode previously disposed on its surface opposite to the display surface of the first plate assembly, the common electrode having an area large enough to cover at least the entire display region of the first plate assembly, a third plate, means for fixing the first plate assembly relative to the second and third plates so as to locate the first plate assembly between the second plate and the third plate, and a liquid crystal material enclosed at least between the second plate and the first plate assembly.

8 Claims, 6 Drawing Sheets

FIG. IA
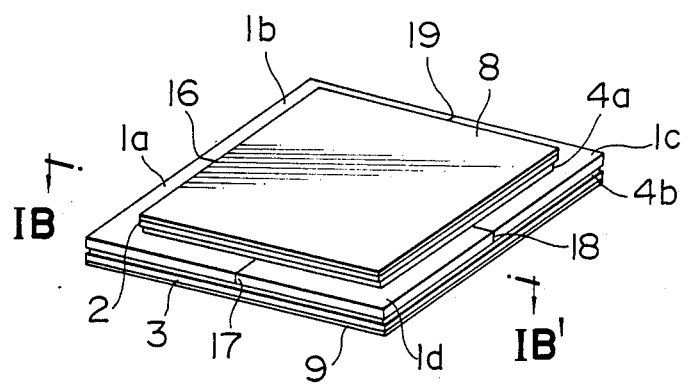
FIG. IB
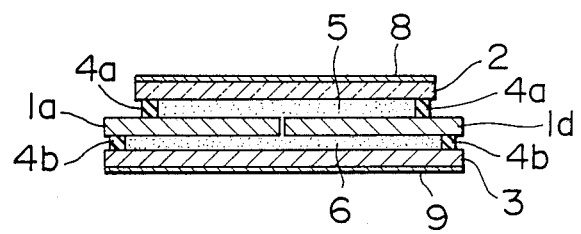

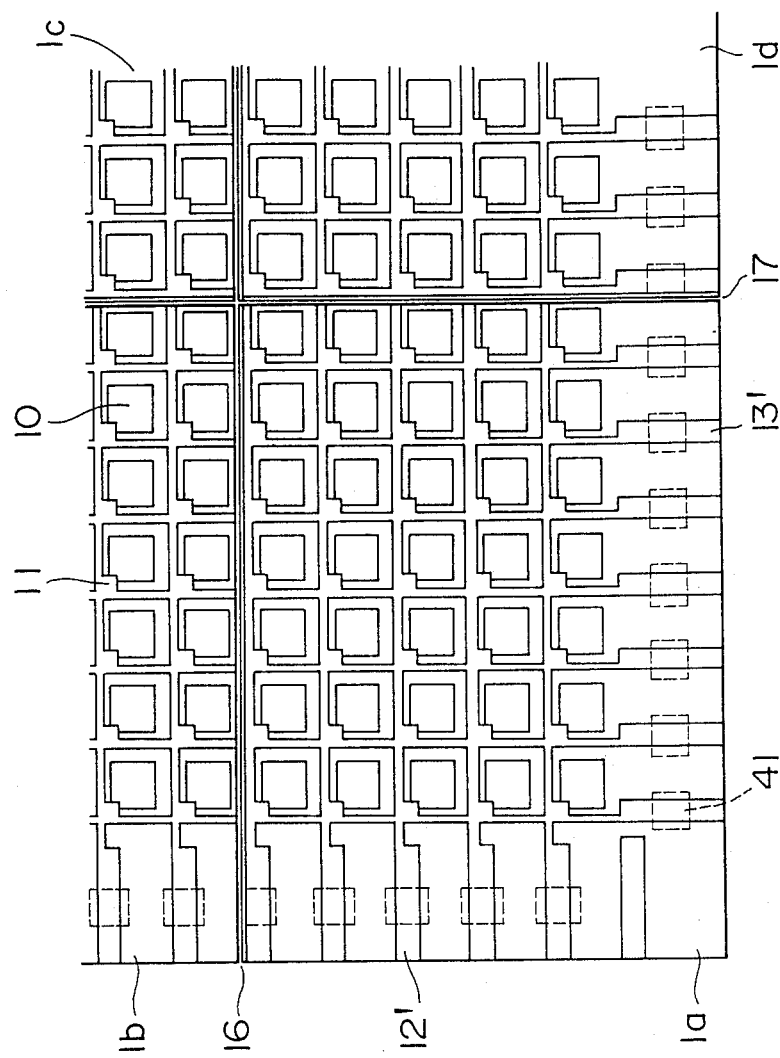

MULTIPANEL LIQUID CRYSTAL DISPLAY DEVICE

BACKGROUND OF THE INVENTION

This invention relates to a multipanel liquid crystal display device and a method of manufacturing the same. More particularly, this invention relates to a liquid crystal display device formed by combining two or four liquid crystal display panels to increase the displayable area and relates also to a method of manufacturing such a display device.

The size of a single liquid crystal display panel has a limitation due to the technical difficulty of manufacturing large-sized ones, and the size of such a display panel presently available is commonly only about 10 cm × 10 cm. Even in the case of a large-sized liquid crystal display panel made on an experimental basis in a laboratory, its size is 20 cm × 20 cm at the maximum. Therefore, in order to provide a large displayable area, a plurality of liquid crystal display panels are combined together to form a multipanel liquid crystal display device as disclosed in, for example, Japanese patent laid-open application, JP No.-A-61-77884. However, such a prior art multipanel liquid crystal display device has a problem which will be described with reference to FIG. 8 of the drawings.

FIG. 8 is a schematic sectional view showing the structure of a joint between liquid crystal display panels in such a prior art display device. Referring to FIG. 8, a pair of liquid crystal display panels 100 of small size, each including a pair of spaced glass plates 101, a liquid crystal 102 filled in a gap between the glass plates 101 and sealed by a sealing member 103, and electrode terminals 104, are joined together at their confronting ends by a solder material 105 interconnecting the electrode terminals 104 of the adjoining liquid crystal display panels 100.

It will be seen in FIG. 8 that in order to interconnect the liquid crystal display panels 100 in the prior art, the sealing members 103 are necessarily disposed adjacent to the confronting ends of the liquid crystal panels 100 and a substantial space is required between the confronting ends of the panels for electrically connecting the electrode terminals 104 to each other by the solder material 105. Thus, there exists an elongated narrow non-display area or blank portion between the confronting ends of every adjacent two display panels. Therefore, the prior art multipanel liquid crystal display device has a problem that a lattice-like blank portion having a width of about 2 mm is inevitably formed at the joint between the display panels.

SUMMARY OF THE INVENTION

It is an object of the present invention to provide a multipanel liquid crystal display device in which such a blank portion formed at the joint between adjoining liquid crystal display panels and unable to serve for display is minimized so that a widest possible area of the display device is available for display of pictures of high quality. Another object of the present invention is to provide a method of manufacturing such a display device.

The multipanel liquid crystal display device of the present invention which attains the above object comprises two or four panels of square shape each including a first plate of square shape. These two or four first plates are disposed in such a positional relation that at least two orthogonally crossing sides of each of the plates are not adjoined to any of the remaining plates, thereby forming a planar assembly lying in a plane. One of the major surfaces of each of the first plates provides a display region except for marginal edges adjacent to the at least two orthogonally crossing sides which are not adjoined by any of the remaining plates, and picture element electrodes arranged in a matrix pattern are previously provided on this display region. Further, in each first plate, electrode lead-out terminals connected to the respective picture element electrodes are previously disposed along the marginal edges adjacent to the two sides described above. The liquid crystal display device further comprises a transparent second plate having a common electrode previously disposed on its surface opposite to the display surface of the first plate assembly, the common electrode having an area large enough to cover at least the entire display region of the first plate assembly, a third plate, means for fixing the first plate assembly relative to the second and third plates so as to locate the first plate assembly between the second plate and the third plate, and a liquid crystal material enclosed at least between the second plate and the first plate assembly.

Thus, in the multipanel liquid crystal display device of the present invention having the structure described above, the electrode lead-out terminals of the matrix-pattern picture element electrodes in each of the panels are disposed on one surface of the first plate along the marginal edges adjacent to the two orthogonally crossing sides which are not adjoined to any one of the remaining first plates. Thus, the individual panels can be driven independently of one another, and the picture element electrodes of any one of the panels need not be interconnected to those of the others. Therefore, the gap between the panels can be made very small, and the blank portions, which are inevitable in the prior art device, can be substantially eliminated.

BRIEF DESCRIPTION OF THE DRAWINGS

FIG. 1A is a schematic perspective view showing the structure of a first embodiment of the multipanel liquid crystal display device of the present invention.

FIG. 1B is a schematic sectional view taken along the line IB–IB' in FIG. 1A.

FIG. 4 is a schematic plan view showing the arrangement of various elements on the first plate in each of the panels in the second embodiment of the present invention.

DESCRIPTION OF THE PREFERRED EMBODIMENTS

Figure 2:
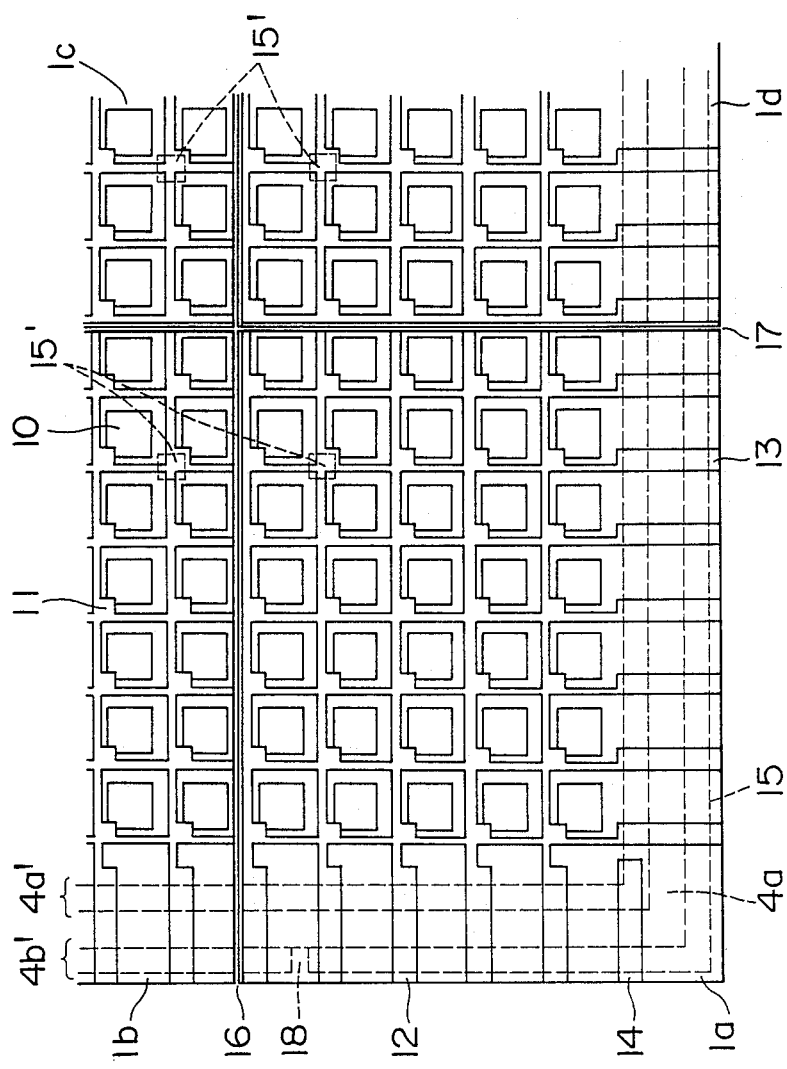
FIG. 2 is a schematic plan view showing the arrangement of various elements on the first plate in each of the panels in the first embodiment of the present invention.

A first embodiment of the multipanel liquid crystal display device of the present invention will be described with reference to FIGS. 1A, 1B and 2. As shown in FIGS. 1A and 1B, the first embodiment of the liquid crystal display device comprises a first plate assembly in which first plates 1a, 1b, 1c and 1d of small size constituting four panels of square shape respectively are arranged in two rows each including two panels. One of the major surfaces of each of these first plates 1a, 1b, 1c and 1d provides part of a display region of the liquid crystal display device, and picture element electrodes 10 and associated thin-film switching elements 11 are disposed on such a surface in a manner well known in the art, as shown in FIG. 2. Electrode terminals for connecting the picture element electrodes 10 to an external driver circuit are disposed on the same surface, of each first plate along marginal edges adjacent to two orthogonally crossing sides which are not adjoined to any one of the remaining first plates. The liquid crystal display device further comprises a transparent second plate 2 having a transparent common electrode disposed on its surface opposite to the display surface of the first plate assembly and having an area large enough to cover at least the entire display region of the first plate assembly, and a transparent third plate 3 having a size which is generally the same as that of the first plate assembly. The first plate assembly, the second plate 2 and the third plate 3 are fixed in such a positional relation that the first plate assembly is located between the second plate 2 and the third plate 3, the third plate 3 substantially registering with the first plate assembly, and the common electrode of the second plate 2 is opposing to the display region of the first plate assembly. More precisely, the second plate 2 is fixed to the first plate assembly by a bonding and sealing member 4a, and the third plate 3 is fixed to the first plate assembly by a bonding and sealing member 4b. A liquid crystal material 5 is filled in the cell gap between the second plate 2 and the first plate assembly, and a liquid crystal material 6 is filled in the cell gap between the third plate 3 and the first plate assembly. The thickness of the layer of the liquid crystal material 5 is adjusted at a uniform thickness by controlling the thickness of the sealing member 4a and also by providing a suitable number of spacers between the second plate 2 and the first plate assembly as described later. On the other hand, the liquid crystal material 6 is provided to communicate with the liquid crystal material 5 thereby to prevent leakage of the liquid crystal material 5 through the gap between the adjacent first plates and has not any direct concern with the display. Polarizing plates 8 and 9 are bonded to the outer surfaces of the second and third plates 2 and 3 respectively. One of these polarizing plates 8 and 9 may be eliminated depending on the mode of display by the liquid crystal. Further, the polarizing plates 8 and 9 may be bonded to the inner surfaces of the second and third plates 2 and 3 respectively.

The liquid crystal 5 is of, for example, a twist-nematic type or a guest-host type and is subjected to selected orientation processing according to a desired display mode to be used. The term "orientation processing" is used herein to mean that predetermined processing is applied to a so-called orientation film provided on the surface facing to the liquid crystal material of each of the second plate 2 and the first plates 1a, 1b, 1c and 1d. By applying such processing, molecules of the liquid crystal 5 can be oriented in a selected direction. On the other hand, the liquid crystal 6 is subjected to parallel orientation processing so that its molecules are oriented parallely in the same direction as the direction in polarization obtained by the polarizing plate 9. In lieu of orienting the molecules of the liquid crystal material 6 in the same direction as the direction in polarization by the polarizing plate 9, the molecules of the liquid crystal 6 may be oriented in the direction perpendicular to the surface of the first plate assembly. In such a case, the liquid crystal 6 may be subjected to perpendicular orientation processing so that its molecules may be oriented in the direction described above. Alternatively, a transparent electrode may be formed on the liquid crystal-side surface of each of the first plates 1a, 1b, 1c, 1d and third plate 3, and an electric field may be applied across these transparent electrodes so as to orientate the molecules of the liquid crystal 6 in the direction perpendicular to the surface of the first plate assembly.

By orientating the liquid crystals 5 and 6 in the manner as described above, the transparent second plate 2, first plates 1a to 1d and liquid crystal 5 provide in combination a function of allowing light to pass only through selected parts of the display area in a usual manner, while the first plates 1a to 1d, third plate 3 and the liquid crystal 6 provide in combination a transparent layer over a whole of the display area, whereby the liquid crystal device of the first embodiment of the present invention operates as a multipanel liquid crystal display device of light transmission type.

The confronting ends of the adjacent first plates are merely located in close face-to-face relationship with each other so that the gap between the adjacent first plates is very small or the order of only about 50μ. Therefore, the blank portion left between the adjacent panels is so small that it can be hardly visually sensed. However, a very small gap is inevitably formed between the adjacent first plates. In order to prevent external leakage of the liquid crystal material 5 through this gap, a sealed space only communicating with the liquid crystal material 5 is formed between the first plate assembly and the third plate 3, and the liquid crystal material 6 is filled in the sealed space. Therefore, when the liquid crystal display device is of, for example, a light transmission type having its light source (not shown) disposed beneath the structure shown in FIG. 1B, and a picture displayed by the switching function of the liquid crystal material 5 is observed from above the structure shown in FIG. 1B, the liquid crystal material 6 has not any direct concern with the picture display, and its sole function is to permit transmission of light therethrough.

Materials of the various elements including the individual plates, picture element electrodes, liquid crystal materials and sealing members constituting the first embodiment of the present invention are similar to those of the corresponding elements of the prior art liquid crystal display device, and any detailed description of such materials is unnecessary.

The first plates 1a, 1b, 1c and 1d of small size provided with the picture element electrodes 10 will be described in further detail with reference to FIG. 2.

In each of the first plates 1a, 1b, 1c and 1d in the first embodiment of the present invention, the thin-film switching element 11 is associated with each of the picture element electrodes 10 arranged in a matrix pattern in a manner well known in the art for driving the liquid crystal display device. Connection terminals including scan electrode terminals 12 and display electrode terminals 13 for electrical connection to an external driver circuit (not shown) are deposited exclusively in the area along the marginal edges adjacent to the two orthogonally crossing sides of each of the first plates 1a to 1d according to the technique of terminal pattern formation. Further, a common electrode terminal 14 for electrical connection to the common electrode of the transparent second plate 2 is disposed adjacent to the corner of each of the first plates 1a to 1d.

Further, the remaining two sides, where no electrode terminals are formed, of each of the first plates 1a to 1d terminate at the extreme limits of the wiring pattern and picture element electrode pattern.

A method of manufacturing the first embodiment of the multipanel liquid crystal display device of the present invention will now be described.

(1) As shown in FIG. 2, the four first plates 1a to 1d are disposed in side-by-side relationship such that any adjacent two plates are bounded each other by their sides where no electrical terminal is formed and with no electrical connection at the boundary. Then, the sealing member 4a is disposed on a sealing area 15 as shown by the dotted lines 4a' in FIG. 2, and the transparent second plate 2 is bonded to the front surfaces of the first plates 1a to 1d while interposing the sealing member 4a therebetween as shown in FIG. 1B. In order that the cell gap between the transparent second plate 2 and the first plates 1a to 1d can be maintained uniform, spacers made of the same material as that of the sealing member 4a may be previously provided on cell-gap adjusting points 15' as shown in FIG. 2. Alternatively, fibers or the like having a desired diameter may be distributed to maintain the uniformity of the cell gap.

(2) Then, the sealing member 4b is disposed on the sealing area 15 as shown by the dotted lines 4b' in FIG. 2, and the transparent third plate 3 is bonded to the rear surfaces of the first plates 1a to 1d while interposing the sealing member 4b therebetween as shown in FIG. 1B. In this step, a liquid crystal injection port 18 is prepared in a portion of the sealing member 4b. Then, externally exposed portions of butt joints 16 to 19 between the first plates 1a, 1b, 1c and 1d are also bonded together. When so required, such portions are reinforced with, for example, an ultraviolet-sensitive setting resin commonly used for sealing.

(3) After filling the liquid crystal material from the injection port 18, this injection port 18 is sealed. The liquid crystal material filled into the cell gap between the first plates 1a to 1d and the third plate 3 provides the layer of the liquid crystal 6. The liquid crystal material also passes through the very small gap at the butt joints between the first plates 1a to 1d into the display panel part (that is, the cell gap between the first plates 1a to 1d and the second plate 2) to provide the layer of the liquid crystal 5.

It will be apparent from the above description of the first embodiment of the present invention that the present invention substantially eliminates the undesirable blank portions left at the liquid crystal sealing portions of and at the electrode connections between the liquid crystal display panels of the prior art multipanel liquid crystal display device. Therefore, pictures of high quality can be displayed on an increased display area.

A second embodiment of the present invention which is as effective as the first embodiment will be described with reference to FIGS. 3A, 3B, 4 and 5. In FIGS. 3A to 5, like reference numerals are used to designate like parts appearing in FIGS. 1A, 1B and 2.

Figure 3A:
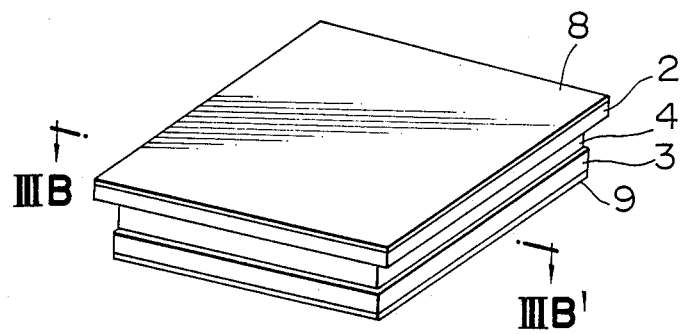
FIG. 3A is a schematic perspective view showing the structure of a second embodiment of the present invention.
Figure 3B:
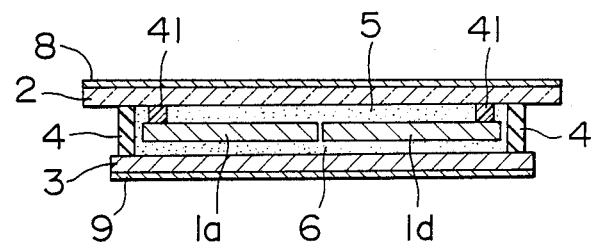
FIG. 3B is a schematic sectional view taken along the line IIIB–IIIB' in FIG. 3A.
Figure 5:
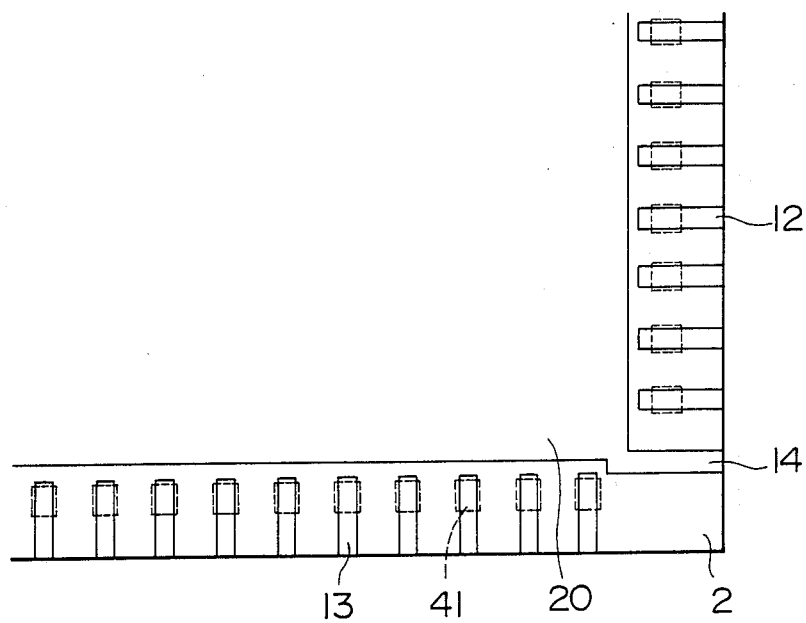
FIG. 5 is a schematic partial plan view showing the arrangement of electrode terminals along the marginal edges of the second plate in the second embodiment of the present invention.

FIG. 3A is a schematic perspective view showing the second embodiment of the present invention, FIG. 3B is a schematic sectional view taken along the line IIIB-IIIB' in FIG. 3A, FIG. 4 is a schematic plan view showing the arrangement of picture element electrodes on one of first plates in the second embodiment, and FIG. 5 is a schematic partial plan view showing the arrangement of various electrode terminals on a transparent second plate in the second embodiment.

As shown in FIGS. 3A and 3B, a transparent second plate 2 formed with a common electrode, a sealing-purpose third plate 3 and a sealing member 4 are combined to constitute a liquid crystal cell, and an assembly of four first plates 1a to 1d of small size similar to that provided in the first embodiment is disposed in the liquid crystal cell. Referring to FIG. 4, picture element electrodes 10 formed on the first plates 1a to 1d are electrically connected by an electrically conductive bonding agent 41 to various electrode terminals formed on the second plate 2 at the time of formation of the common electrode, so that the picture element electrodes 10 can be connected to an external driver circuit (not shown). The second embodiment of the liquid crystal display device is also of the light transmission type as in the case of the first embodiment, and liquid crystals 5 and 6 enclosed in the liquid crystal cell are oriented in directions similar to those in the first embodiment.

The electrode pattern on each of the first plates 1a to 1d and that on the second plate 2 are as, for example, shown in FIGS. 4 and 5 respectively. Referring to FIG. 4 again, the electrode pattern on each of the first plates 1a to 1d is the same as that of the first plates in the first embodiment except that the common electrode terminal 14 shown in FIG. 2 is not provided. Referring to FIG. 5, the electrode pattern on the second plate 2 includes a common electrode 20, a common electrode terminal 14, scan electrode terminals 12 and display electrode terminals 13. The picture element electrodes 10 of the first plates 1a to 1d are electrically connected at their scan electrode connecting portions 12' and display electrode connecting portions 13' to the scan electrode terminals 12 and display electrode terminals 13 respectively of the second plate 2 by the conductive bonding agent 41 to be connected to the external driver circuit. In this second embodiment, the cell gap is determined by the thickness of the conductive bonding agent 41.

It will be seen from the above description that the first plates 1a to 1d formed with the picture element electrodes 10 do not participate in the enclosure and sealing of the liquid crystals 5 and 6 unlike the first embodiment. However, the second embodiment is as effective as the first embodiment in that a widest possible displayable area free from blank portions can be provided.

Figure 6:
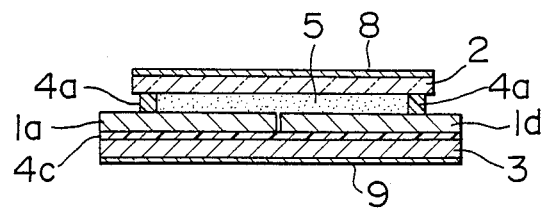
FIG. 6 is a schematic sectional view showing the structure of a third embodiment of the present invention.
Figure 7:
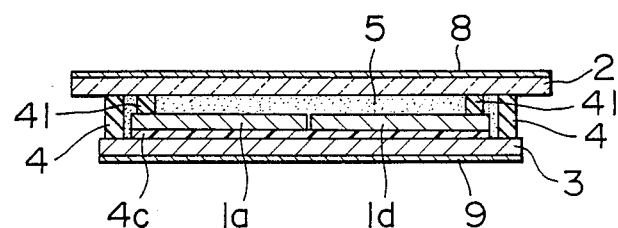
FIG. 7 is a schematic sectional view showing the structure of a fourth embodiment of the present invention.
Figure 8:
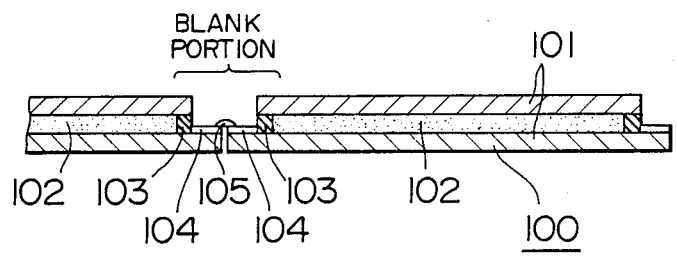
FIG. 8 is a schematic sectional view showing the structure of the joint between panels in a prior art multipanel liquid display device.

A third and a fourth embodiment of the present invention will be described with reference to FIGS. 6 and 7 respectively. FIG. 6 is a schematic sectional view of the third embodiment of the present invention, and FIG. 7 is a schematic sectional view of the fourth embodiment of the present invention.

The third and fourth embodiments are partial modifications of the first and second embodiments respectively in that, in lieu of the liquid crystal 6, a transparent bonding agent 4c is filled in the space receiving the liquid crystal 6. An advantage of the third and fourth embodiments having such structures is that the parallel or perpendicular orientation processing of the liquid crystal 6 or the means for effecting such processing is unnecessary.

The above description has referred to various embodiments of the multipanel liquid crystal display device of light transmission type. However, a multipanel liquid crystal display device of light reflection type can also be provided when, for example, opaque plates such as those cut from silicon wafers are used in place of the first plates 1a to 1d, and a light reflective material is used to form the picture element electrodes 10. When, for example, the first and second embodiments are modified to such a light reflection type, the parallel or perpendicular orientation processing of the liquid crystal 6 which does not participate in the display or the means for effecting the processing is unnecessary, and the polarizing plate 9 is also unnecessary.

Further, although the above description has referred to various embodiments comprising four first plates 1a to 1d formed with picture element electrodes, the number of the first plates may be two instead of four. Even in such a case, a displayable area not including blank portions can be similarly provided. However, when the liquid crystal display device comprises two first plates formed with picture element electrodes, it is necessary to suitably correspondingly change the electrode pattern on each of the first plates.

Furthermore, the present invention can employ first plates each having a built-in driver circuit for driving thin-film switching elements associated with picture element electrodes. It is apparent that such a liquid crystal display device requires a smaller number of electrode terminals for connection to an external circuit, and the mass-productivity can be greatly improved.

Further, although the aforementioned embodiments have referred to a display mode using polarizing plates, it is apparent that the present invention is equally effectively applicable to a display mode not using any polarizing plates.

It will be understood from the foregoing detailed description that the present invention provides a multipanel liquid crystal display device in which two or four small-sized plates of square shape formed with a plurality of picture element electrodes are sandwiched between two large-sized plates to constitute a unitary display panel structure into which a liquid crystal material is injected and sealed against leakage, and external connection terminals of the picture element electrodes are arranged along the marginal edges adjacent to at least two orthogonally crossing sides of the individual small-sized plates to be connected to an external driver circuit. Therefore, undesirable blank portions existed at the liquid-crystal sealing portions of and at the electrode connecting portions between the small-sized display panels of the prior art multipanel liquid crystal display device can be eliminated so that pictures of high quality can be displayed on a widest possible displayable area.

What is claimed is:

1. A multipanel liquid crystal display device comprising:

a first plate assembly including two or four first small plates of square shape disposed side-by-side on a common plane to form a substantially continuous large square shape plane, said large square shape plane having a marginal region along four sides of the large square shape plane and a display region surrounded by said marginal region;

first electrode means formed in a matrix pattern on one main surface of each of said first plates and including picture element electrodes disposed on an area of said one main surface corresponding to a part of said display region, and electrode terminals disposed on an area of said one main surface corresponding to a part of said marginal region and connected to said picture element electrodes, respectively;

a transparent second plate of square shape having one main surface of a size sufficient to cover at least said display region of said first plate assembly;

a transparent common electrode formed on said one main surface of said second plate;

a third plate of square shape facing to said first plate assembly;

means for fixing said first plate assembly and said second and third plates such that said first plate assembly is disposed between said second and third plates with a first space between said first plate assembly and said second plate and a second space between said first plate assembly and said third plate and for tightly sealing said first and second spaces from the outside while allowing said first and second spaces to communicate with each other; and a liquid crystal material filled in said first and second spaces, an orientation of said liquid crystal material filled in said first space being controllable by energization of said picture element electrodes, and an orientation of said liquid crystal material filled in said second space being fixed.

2. A multipanel liquid crystal display device according to claim 1, wherein said first and third plates are made of a transparent material, and said liquid crystal material filled in said second space is oriented in a direction perpendicular with respect to said first plate assembly.

3. A multipanel liquid crystal display device according to claim 1, wherein said picture element electrodes provided on each of said first plates constituting said first plate assembly are made of a light reflective material.

4. A multipanel liquid crystal display device according to claim 1, wherein said first plate assembly is tightly fixed to said second and third plates, respectively so that said first and second spaces communicate with each other only through gaps formed between any adjacent two of said small first plates.

5. A multipanel liquid crystal display device according to claim 1, wherein said third plate is tightly fixed to said second plate such that said first plate assembly and said first space are disposed within said second space.

6. A multipanel liquid crystal display device comprising:

a first plate assembly including two or four first small plates of square shape disposed side-by-side on a common plane to form a substantially continuous large square shape plane, said large square shape plane having a marginal region along four sides of the large square shape plane and a display region surrounded by said marginal region;

first electrode means formed in a matrix pattern on one main surface of each of said first plates and including picture element electrodes disposed on an area of said one main surface corresponding to a part of said display region, and electrode terminals disposed on an area of said one main surface corresponding to a part of said marginal region and connected to said picture element electrodes, respectively;

a transparent second plate of square shape having one main surface of a size sufficient to cover at least said display region of said first plate assembly and fixed to said first plate assembly with a space between said first plate assembly and said second plate;

a transparent common electrode formed on said one main surface of said second plate;

a third plate of square shape fixed by a bonding agent to said first plate assembly so as to seal any gap formed between any adjacent two of said first small plates; and a liquid crystal material filled in said first space and having an orientation controllable by energization of said picture element electrodes.

7. A multipanel liquid crystal display device according to claim 6, wherein said picture element electrodes are made of a light reflective material.

8. A multipanel liquid crystal display device according to claim 6, wherein said first and second plates and said bonding agent fixed said third plate to said first plate assembly are made of a transparent material.

* * * * *